UNITED STATES PATENT OFFICE.

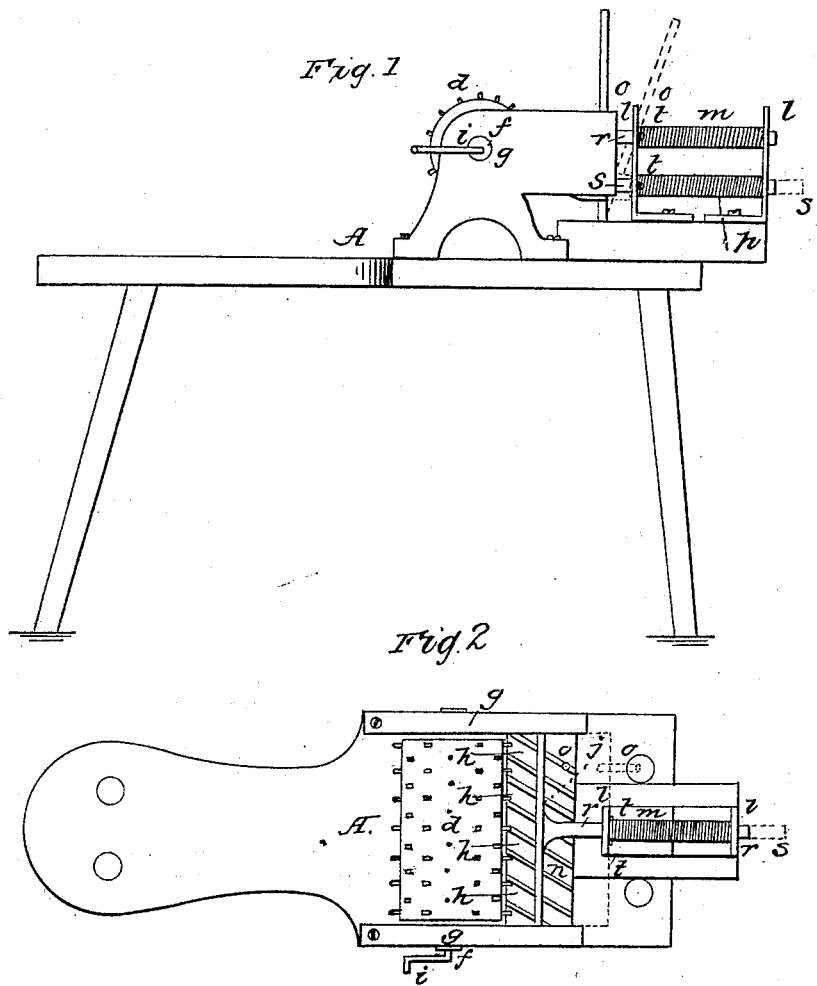

JEREMIAH P. SMITH, OF HUMMELSTOWN, PENNSYLVANIA.

IMPROVEMENT IN CORN-SHELLERS.

Specification forming part of Letters Patent No. 35,185, dated May 6, 1862.

*To all whom it may concern:*

Be it known that I, JEREMIAH P. SMITH, of Hummelstown, in the county of Dauphin and State of Pennsylvania, have invented a new and Improved Machine for Shelling Corn; and I do hereby declare that the following is a full and exact description thereof, reference being had to the accompanying drawings, and to the letters of reference marked thereon.

Figure 1 is a side elevation of my improved corn-sheller, and Fig. 2 is a plan thereof.

Like letters designate corresponding parts in both figures.

A suitable stand or bench, A, is provided, and the shelling-cylinder $d$ is mounted in standards $g$ $g$ thereon, the shaft turning in suitable bearings, $f$ $f$. The shelling-cylinder is provided with suitable teeth for shelling off the grains, and may have a conical enlargement at one end, (not shown in the drawings,) to insure the shelling of the tips of the ears. It is worked by the crank $i$ or by a treadle, as most convenient. It acts in connection with a shelling-bar, $j$, and a sliding or shifting breast-beam, $n$.

The shelling-bar $j$ has a shank or stem, $r$, which slides in bearings $l$ $l$, and has a spring, $m$, on it for forcing the bar toward the shelling-cylinder $d$, a stop, $t$, preventing its approach too near to said cylinder. This shelling-bar serves to hold the ears of corn to the shelling-cylinder with sufficient force, the spring $m$ being designed to adapt the intermediate space to different sizes of the ears of corn.

The shifting breast-beam $n$ serves to sustain the ears of corn while shelling and then to let out the cobs as soon as all the grains are shelled off. For this purpose it also has a shank or stem, $s$, which slides in the bearings $l$ $l$, a spring, $p$, being likewise added to hold the breast-beam up to the shelling-cylinder; also, a stop, $t$, allows the breast-beam to approach and remain closely to, without coming in contact with, the shelling-cylinder. A hand-lever, $o$, is pivoted to the bench below, and thence extends upward through, or is otherwise attached to, the breast-beam, to enable the operator to move the breast-beam away from the shelling-cylinder to let out the cobs. There are oblique ribs $h$ $h$ on the upper surface of the breast-beam. These serve to hold the cobs from turning too readily and assist in shelling. They also serve, in connection with a conical enlargement or "bevel" on one end of the shelling-cylinder, (when used,) to force the ears of corn along lengthwise against the same, to insure the shelling of the tips of the ears.

What I claim as my invention, and desire to secure by Letters Patent, is—

1. The shifting breast-beam $n$, arranged and operating in combination with the shelling-cylinder $d$, substantially as and for the purpose herein specified.

2. The combination of the shelling-bar $j$ with the shelling-cylinder $d$ and shifting breast-beam $n$, substantially as herein set forth.

JEREMIAH P. SMITH.

Witnesses:
JOHN PHILLIPS, Sr.,
JOSEPH F. HUMMEL,
JOHN M. WHEELER.